US007021409B2

(12) United States Patent
Tamor

(10) Patent No.: US 7,021,409 B2
(45) Date of Patent: Apr. 4, 2006

(54) CONTROL SYSTEM FOR A HYBRID ELECTRIC VEHICLE TO ANTICIPATE THE NEED FOR A MODE CHANGE

(75) Inventor: Michael Alan Tamor, Toledo, OH (US)

(73) Assignee: Ford Global Technologies, LLC, Dearborn, MI (US)

( * ) Notice: Subject to any disclaimer, the term of this patent is extended or adjusted under 35 U.S.C. 154(b) by 225 days.

(21) Appl. No.: 10/230,707

(22) Filed: Aug. 29, 2002

(65) Prior Publication Data

US 2003/0006076 A1 Jan. 9, 2003

Related U.S. Application Data

(63) Continuation-in-part of application No. 09/686,472, filed on Oct. 11, 2000, now abandoned.

(51) Int. Cl.
*B60K 1/00* (2006.01)

(52) U.S. Cl. .......................................... 180/65.2; 477/3

(58) Field of Classification Search ................ 180/65.2, 180/65.3, 65.4, 65.6, 65.7, 65.8; 701/22; 477/2–6; 290/40 A–40 D; 322/14–16
See application file for complete search history.

(56) References Cited

U.S. PATENT DOCUMENTS

| | | | | |
|---|---|---|---|---|
| 5,285,111 | A | | 2/1994 | Sherman |
| 5,635,805 | A | | 6/1997 | Ibaraki et al. |
| 5,697,466 | A | | 12/1997 | Moroto et al. |
| 5,713,814 | A | | 2/1998 | Hara et al. |
| 5,820,172 | A | | 10/1998 | Brigham et al. |
| 5,841,201 | A | * | 11/1998 | Tabata et al. ............ 290/40 C |
| 5,842,534 | A | | 12/1998 | Frank |
| 5,865,263 | A | | 2/1999 | Yamaguchi et al. |
| 5,898,282 | A | | 4/1999 | Drozdz et al. |
| 5,935,040 | A | | 8/1999 | Tabata et al. |
| 5,939,794 | A | | 8/1999 | Sakai et al. |
| 6,019,183 | A | | 2/2000 | Shimasaki et al. |
| 6,026,921 | A | | 2/2000 | Aoyama et al. |
| 6,059,064 | A | | 5/2000 | Nagana et al. |
| 6,064,161 | A | | 5/2000 | Takahara et al. |
| 6,090,007 | A | | 7/2000 | Nakajima et al. |
| 6,098,733 | A | | 8/2000 | Ibaraki et al. |
| 6,102,144 | A | | 8/2000 | Lutz |
| 6,116,363 | A | | 9/2000 | Frank |
| 6,164,400 | A | | 12/2000 | Jankovic et al. |
| 6,176,808 | B1 | | 1/2001 | Brown et al. |
| 6,201,312 | B1 | | 3/2001 | Shioiri et al. |
| 6,217,479 | B1 | | 4/2001 | Brown et al. |

(Continued)

FOREIGN PATENT DOCUMENTS

| | | |
|---|---|---|
| DE | 44 22 636 A1 | 1/1996 |
| EP | 0 769 402 A2 | 4/1997 |
| EP | 0 812 717 A3 | 12/1997 |
| EP | 0 699 554 B1 | 4/1998 |
| EP | 1 072 460 A2 | 1/2001 |
| EP | 1 136 311 A2 | 9/2001 |
| JP | 2000-219062 | 8/2000 |

*Primary Examiner*—Bryan Fischmann
(74) *Attorney, Agent, or Firm*—Brooks Kushman P.C.; Carlos Hanze

(57) ABSTRACT

A parallel hybrid electric vehicle method and system including an internal combustion engine (ICE), an electric traction motor/generator, and a controller. A control strategy is provided to prevent unpredicted or undesired engine starts by anticipating the need for the vehicle engine, while avoiding "false starting" the engine or allowing an annoying lag in performance that will occur if the engine is not started in advance of an actual requirement. The invention anticipates the need for engine starts by monitoring vehicle speed and driver demand and their rates of change. The invention allows consistent performance and operates in a manner pleasing to the customer because a substantially constant drive force is maintained.

9 Claims, 4 Drawing Sheets

U.S. PATENT DOCUMENTS

| | | | | | |
|---|---|---|---|---|---|
| 6,231,479 | B1 | | 5/2001 | Kraska et al. | |
| 6,242,873 | B1 | | 6/2001 | Drozdz et al. | |
| 6,253,140 | B1 | | 6/2001 | Jain et al. | |
| 6,253,865 | B1 | | 7/2001 | Suzuki | |
| 6,278,926 | B1 | | 8/2001 | Jain et al. | |
| 6,299,565 | B1 | | 10/2001 | Jain et al. | |
| 6,316,904 | B1 | | 11/2001 | Semenov et al. | |
| 6,364,807 | B1 | | 4/2002 | Koneda et al. | |
| 6,370,463 | B1 | | 4/2002 | Fujii et al. | |
| 6,385,520 | B1 | | 5/2002 | Jain et al. | |
| 6,393,350 | B1 | | 5/2002 | Light et al. | |
| 6,679,214 | B1 | * | 1/2004 | Kobayashi et al. | 123/179.4 |
| 6,746,366 | B1 | * | 6/2004 | Tamor | 477/5 |
| 2003/0004032 | A1 | * | 1/2003 | Tamor | 477/5 |

* cited by examiner

CONTROL SYSTEM FOR A HYBRID ELECTRIC VEHICLE TO ANTICIPATE THE NEED FOR A MODE CHANGE

CROSS-REFERENCE TO RELATED APPLICATIONS

This application is a continuation-in-part of U.S. application Ser. No. 09/686,472, filed Oct. 11, 2000, now abandoned.

BACKGROUND OF THE INVENTION

1. Field of the Invention

The present invention relates generally to hybrid electric vehicles (HEVs), and specifically to a method and system to improve the efficiency and drivability of a HEV by monitoring vehicle control variables and their rate of change, whereby driver demand is anticipated so that unpredicted or undesired engine false starts and performance lags are prevented.

2. Background Art

The need to reduce fossil fuel consumption and undesirable engine exhaust gas emissions from vehicles powered by an internal combustion engine (ICE) is well known. Vehicles powered by battery-powered electric traction motors have attempted to address this need. However, electric vehicles have limited operating range and limited power capabilities. They also require substantial time to recharge their batteries. An alternative solution is to combine an ICE and an electric traction motor in one vehicle. Such vehicles are typically called hybrid electric vehicles (HEVs). See generally, U.S. Pat. No. 5,343,970 (Severinsky). HEVs reduce both undesirable exhaust gas emissions and fuel consumption because a smaller engine can be used. Under certain conditions, the engine can be turned off.

The HEV has been described in a variety of configurations. Many known HEV designs use systems in which an operator is required to select between electric and internal combustion engine operation. In other configurations, the electric motor drives one set of wheels, and the ICE drives a different set of wheels.

Other, more useful, configurations include, for example, a series hybrid electric vehicle (SHEV), which is a vehicle with an engine (most typically an ICE) that powers a generator. The generator, in turn, provides electric power for a battery and an electric traction motor coupled to the drive wheels of the vehicle. No mechanical connection exists between the engine and the drive wheels. Another useful configuration is a parallel hybrid electrical vehicle (PHEV), which is a vehicle with an engine (most typically an ICE), battery, and electric traction motor that combine to provide torque to the drive wheels of the vehicle.

A parallel/series hybrid electric vehicle (PSHEV) has characteristics of both the PHEV and the SHEV. The PSHEV is also known as a torque (or power) split powertrain configuration. In the PSHEV, the engine torque can be used to power a motor/generator and/or contribute to the necessary traction wheel or output shaft torque. The motor/generator generates electrical power for the battery, or it can act as a traction motor to contribute to the necessary wheel or output shaft torque. The traction motor/generator can be used also to recover braking energy to the battery if a regenerative braking system is used.

The desirability of combining the ICE with an electric motor/generator is clear. Fuel consumption and undesirable engine exhaust gas emissions are reduced with no appreciable loss of performance or range of the vehicle. Nevertheless, there remains substantial room for development of ways to optimize HEV operation. This includes the need to ensure that vehicle drivability is consistent, predictable and pleasing to the customer while also maintaining efficiency.

Factors involved in achieving an acceptable level of HEV drivability are the frequency and character of engine-start-and engine-stop events. Frequent engine starts and stops can be annoying, especially if they do not occur in response to any conscious input from the vehicle driver.

Some engine starts and stops are dictated by an energy management strategy (EMS) that seeks to combine the engine and motor drives to achieve maximum fuel economy. For example, the EMS might start the engine whenever demand exceeds a predetermined motive power threshold. Also, the engine must start when driver demand for power is in excess of that available from the electric system.

Frequent, annoying, high-emission, and engine-wearing "false starts" can occur when the engine is started in response to what later proves to be a very brief demand for power in excess of the motive power threshold but still within the drive capabilities. This can occur when quickly pulling out into otherwise slow traffic or surging forward in heavy traffic. Alternatively, starting an engine poses a challenge because its torque is not available instantaneously. An annoying lag in performance will occur if the engine is not started somewhat in advance of the actual engine torque requirement.

An HEV system controller (VSC) must, therefore, control two mode transitions. The first is the transition from a vehicle at rest with the engine off to a vehicle using electric power. The second is the transition from electric driving to engine power in response to an increase in driver demand. (This driver demand transition should not be confused with a less time critical version of the same transition when the engine is started because of a need to charge a battery.) The timely preparation for these transitions is achieved by "anticipators".

A converterless multiple ratio automatic transmission of the kind that may be used in a parallel hybrid electric vehicle powertrain is shown in U.S. Pat. No. 6,217,479, where an engine crankshaft is connected through a damper assembly and a disconnect clutch to the torque input element of multiple-ratio gearing without an intervening torque converter. A continuously slipping forward-drive clutch during an engine-engage operating mode is used, thereby avoiding a need for a separate startup clutch. The lack of a startup clutch, as well as the lack of a hydrokinetic torque converter, reduces the inertia mass which permits a faster response to a command force startup torque at the vehicle wheels.

A control strategy for a hybrid powertrain of the kind disclosed in the '479 patent is described in U.S. Pat. No. 6,364,807. The control strategy of the '807 patent includes a closed-loop clutch pressure modulation technique to effect a smooth transition from an electric motor drive mode to an internal combustion engine drive mode. This is done in cooperation with a control of the fuel supply during the transition. The electric motor in this HEV powertrain may act as an inertial starter, wherein the electric motor freely accelerates up to idle speed where the engine-driven pump has full hydraulic pressure for the clutch following continuously slipping clutch operation during startup.

Another hybrid vehicle powertrain using a multiple-ratio transmission without a torque converter and having a startup clutch located between the induction motor and the engine crankshaft is described in U.S. Pat. No. 6,176,808. An auxiliary launch torque is supplied by the motor during startup in the design of the '808 patent, and regenerative braking with the internal combustion engine inactive is available for charging the battery when the vehicle is in a coast mode.

In HEV operating strategies of the kind described in these prior art patents, the decision to start the engine in response to driver demand is based on vehicle speed and driving torque. The drive power is calculated using torque and motor speed. The total power required for the HEV is not only the drive power, but also power for all other loads, such as accessory load and climate control load. If this total required power exceeds a predetermined threshold for the motor, engine power and, therefore, engine start is required. If the total required power is below a predetermined value, the motor solely provides torque to the powertrain. A hysteresis loop is included in these predetermined values to prevent mode "chattering" when the vehicle nears these power thresholds.

A problem with this prior art system is apparent in an intermediate power range above the power below which it is more efficient to drive with the motor on (perhaps five to ten kW for a typical compact to mid-size vehicle), and below the peak electric-only power capability required for acceptable engine-off launch (twenty to forty kW for the same vehicle). While driving in electric-only mode, a momentary demand for power in this intermediate power range should be met without repetitive starting the engine, and then immediately stopping it. Therefore, a new anticipator strategy is required to improve efficiency and drivability of the HEV by anticipating the need for a driving state or mode change as close as possible to a predetermined optimal moment to create a seamless transition while reducing or eliminating engine "false starts".

It is possible to effect an instantaneous response of the powertrain to a driver command using a so-called feed roller torque calculation. This strategy would anticipate the torque requirements following a command for an increased torque or a decreased torque by calculating a leading indicator of engine torque. That indicator is used to develop a transmission line pressure that is appropriate for a subsequent ratio change and a subsequent driving torque requirement by anticipating the engine torque required following a response to an engine torque request by the driver. This torque feed-forward technique is further refined in a control system described in U.S. Pat. No. 6,253,140 where the engagement of the clutch, as the gear ratio change nears completion, is controlled with a pressure-shaping function used to reduce the desired slip rate to effect a smooth termination of the slip of one friction element as a companion friction element during a ratio change gains torque-transmitting capacity. This is achieved using an adaptive engagement technique so that the engagement characteristics of the controller can be learned during a ratio change and used in a subsequent ratio change. In this way, ratio change smoothness can be achieved by compensating for driveline variables such as changes in coefficients of friction due to clutch wear, for example, and due to changes in spring loads at the friction element actuators.

Another example of a converterless multiple-ratio transmission is described in U.S. Pat. No. 6,299,565 wherein the clutches, during a ratio change, are controlled by a strategy that makes it possible to achieve maximum vehicle acceleration using a controllable wet clutch between the engine and the input of a synchronous transmission.

Another example of a hybrid electric vehicle powertrain is described in U.S. Pat. No. 6,316,904 wherein the induction motor is controlled using a speed sensorless controller.

The control systems of these prior art patents do not describe nor suggest an anticipator function for anticipating the need for a driving state change so that an optimal seamless transition between driving state modes can be achieved.

A successful "anticipator" function must predict either: 1) that the demand power is likely to remain higher than a motive power threshold, but well within the motor and battery capacities so that the engine will be started in as seamless a manner as possible; or 2) that the demand power is likely to exceed the motor and battery capacities within a very short time, and the engine should be started quickly in a "kick-down" fashion. In the latter case, sufficient motor torque must be held in reserve to compensate for the sudden load of the slewing engine.

SUMMARY OF THE INVENTION

Accordingly, an objective of the present invention is to improve the drivability and efficiency of a parallel hybrid electric vehicle (PHEV) powertrain system so that the vehicle has predictable drivability as perceived by the vehicle operator.

Specifically, it is an object of the present invention to provide a strategy to prevent unpredicted or undesired engine starts by anticipating the need for the vehicle engine, while not "false starting" the engine or allowing an annoying lag in the engine's performance. This is achieved by the control of the present invention by monitoring both vehicle speed and driver demand, as well as their rates of change.

It is a further objective of the invention to provide an anticipator strategy that is a mathematical function of a predetermined set of system variables such as master cylinder brake pressure (MCP), throttle position, vehicle speed, vehicle mass, and road grade, including any rates of change of these system variables. Estimates of time remaining from the instant of estimation to the moment at which the vehicle system cannot meet the driver demand in the present mode are calculated. When the anticipated time remaining before the incipient transition approaches the time required to smoothly execute that transition, a transition command is executed.

DETAILED DESCRIPTION OF THE DISCLOSED EMBODIMENT

Although the embodiment of the invention described is a parallel HEV, the invention could be applied to other HEV configurations.

Figure 1:
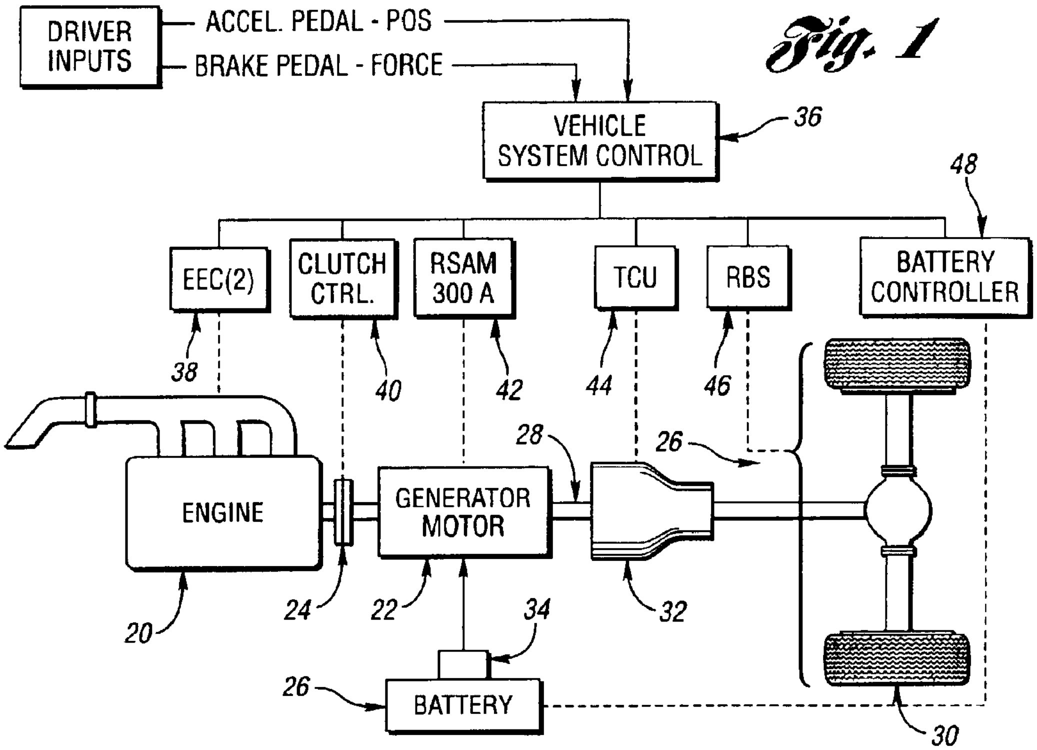
FIG. 1 illustrates the general components of a hybrid electric vehicle (HEV) powertrain with an engine disconnect clutch and a vehicle control system.

FIG. 1 shows general components of a pre-transmission parallel HEV powertrain with an engine disconnect clutch. This pre-transmission configuration is described in U.S. patent application Ser. No. 10/225,824, filed Aug. 22, 2002, now U.S. Pat. No. 6,746,366. U.S. patent application Ser. No. 10/225,824 is a continuation-in-part of U.S. application Ser. No. 09/686,471, filed Oct. 11, 2000, now abandoned. These applications and U.S. Pat. No. 6,746366 are assigned to the assignee of the present invention. An engine 20 is linked to an electric motor/generator 22 via a disconnect clutch 24. A battery 26 is connected to the motor/generator 22 via an inverter 34, which controls the flow of electrical power to and from the two components. The motor/generator 22, which may be referred to as a drive unit, is connected to a power transfer device 28, such as a drive shaft, which is connected to vehicle traction wheels 30 via a transmission 32. Thus, torque flows from the engine 20 and motor/generator or drive unit 22 through the power transfer device 28 to the wheels 30.

All powertrain components are under the supervisory control of a vehicle system controller (VSC) 36. Each powertrain component has a separate controller under that supervisory control of the VSC 36. An engine controller 38 controls the engine 20. For this application an electronic throttle control (ETC) would be used. The disconnect clutch 24 is under the control of a clutch controller 40. The motor/generator 22 is under the control of a motor/generator controller 42. The transmission 32 is under the control of a transmission control unit 44.

In the disclosed embodiment, the transmission 32 is an electronic converterless transmission (ECLT). The ECLT is a fully synchronous, high-efficiency, power-shifting transmission derived from a current mass-production product known in the prior art. Torque amplification function of the torque converter is provided by the motor/generator drive unit 22. The motor/generator 22 is also used for shift synchronization and dynamic control.

A vehicle brake system is under the control of a regenerative braking control 46, and the battery 26 is under the control of a battery controller 48.

Since the engine 20 can be disconnected from the motor/generator 22 and power transfer device 28, there are three potential powertrain states. These states, which are based on various vehicle demands and commands for the VCS 36, include: the engine 20 only, the motor/generator drive unit 22 only, or the engine 20 and the motor/generator drive unit 22 combined. The disclosed embodiment of this invention is a strategy to determine when the engine should be turned on and off based on driver demand.

Figure 2:
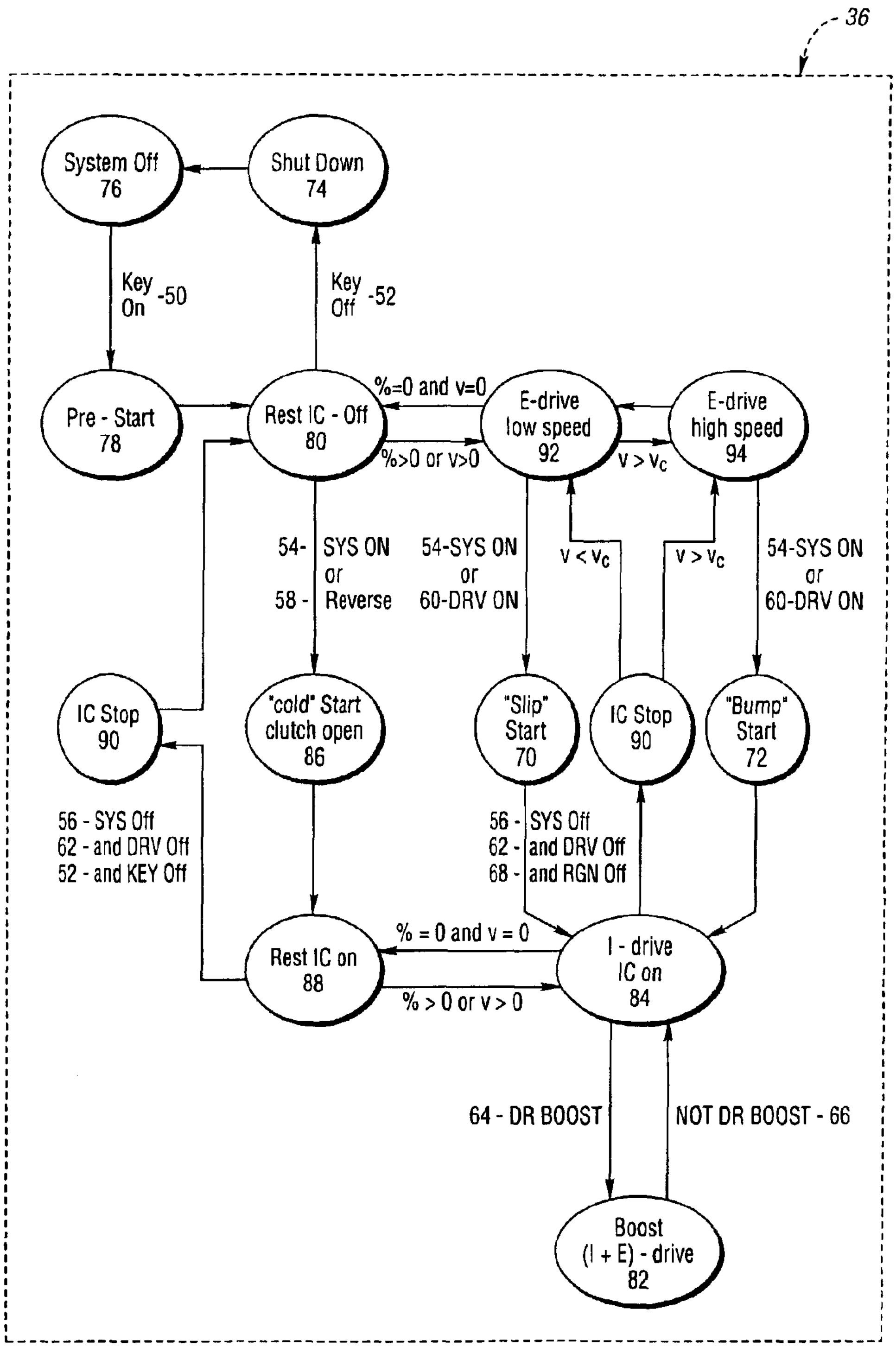
FIG. 2 illustrates a hybrid electric vehicle (HEV) state determination diagram.

A simple state algorithm within the vehicle system control 36 of an HEV is illustrated in FIG. 2. In this Figure, the circles indicate intrinsically transient ("self-exiting") states of starting and stopping vehicle systems, including starting and stopping the engine.

This state algorithm has several "flags" and parameters controlling transitions among the different vehicle states in FIG. 2. A "KEY ON" flag 50 and a "KEY OFF" flag 52 are self-explanatory. The KEY ON flag 50 results in a pre-start state 78 proceeding to a rest IC-OFF 80, whereby the engine 20 is off. The KEY OFF flag 52 results in a vehicle shutdown state 74 command followed by a system-off state 76.

SYS ON and SYS OFF flags 54 and 56 reflect a "basket" of conditions that require starting the engine for reasons other than to satisfy a driver's demand for powertrain torque under the current vehicle conditions (speed, grade, etc.). These include, but are not limited to: the engine 20 temperature below a predetermined value; an after treatment system temperature below a predetermined value; an air conditioner set to its maximum value; low battery 26 state of charge; and gear selector "PRND" in a reverse position 58. The engine 20 must be started when any one of these conditions exist, and can be shut down only when none of these conditions are in force.

The Rest IC-OFF State 80 moves to a "cold" start clutch open state 86 or to a Rest IC on state 88 with the SYS on flag 54 or reverse flag 58. The DRV ON and DRV OFF flags 60 and 62 indicate the need to start or stop the engine 20 based on driver demand "%" (such as accelerator position) and present vehicle speed "v". The DRV ON and DRV OFF flags 60 and 62 will be set and cleared based on a map of % and v. Other considerations, such as d%/dt (rate of change of accelerator position) and grade (if "identifiable"), could also be included.

A DR BOOST flag 64 indicates that driver demand can only be met with a combination of motor/generator 22 and engine 20 power. This is the Boost (I+E)-drive condition 82. The NOT DR BOOST condition 66 means driver demand does not require the combination.

The RGN OFF flag 68 indicates that regenerative braking is occurring. This condition is used to postpone the engine 20 shutdown while significant negative torque is transmitted through the vehicle powertrain, thus preventing what might otherwise be unpleasant braking behavior. Note that regenerative braking can actually take place without master cylinder pressure (MCP) or brake touch, and even with slight throttle.

The "%" is simply an accelerator position in percent representing its full range of 0 to 100 percent. The "$V_c$" notation is a speed below which the motor/generator drive unit 22 is turning too slowly to at that instant "bump start" 72 the engine 20 simply by closing the disconnect clutch 24 leading to an I-drive IC on 84, whereby the engine 20 is on. The engine 20 would spin to below idle speed or be turning too slowly to deliver the requisite torque. The motor/generator drive unit 22 must be spun up by a combination of downshifting the transmission and allowing the drive-away clutch to slip—thus the term "slip start" 70.

The Rest IC ON state 88 transitions to an IC stop 90 state with the SYS OFF flag 56, DRV OFF flag 62, and the KEY OFF flag 52, and back to the REST IC-OFF 80 state. The Rest IC on state 88 also can transition to the I-Drive IC ON state 84 when (using terms defined above) %>0 or V>0. The I-Drive IC on state 84 can also transition to the Rest IC on state 88 when %=0 and V=0.

The Rest IC off state 80 transitions to an electric E-drive low speed state 92 when (using terms defined above) %>0 or V>0. The E-drive low speed state 92 can also transition to the rest IC on state 88 when %=0 and V=0.

The electric E-drive low speed state 92 transitions to the "slip" start state 70 when there is a SYS ON flag 54 or a DRV ON flag 60 that results in the I-Drive IC on state 84. The I-Drive IC on state 84 can transition to the IC stop 90 state with the SYS OFF flag 56, DRV OFF flag 62, and RGN OFF flag 68.

The IC stop 90 state and an E-drive high speed state 94 transition to the electric E-drive low speed state 92 when $V<V_c$. The IC stop 90 state and the E-drive low speed state 92 transition to the E-drive high-speed state 94 when $V>V_c$. Finally, the E-drive high-speed state 94 transitions to the "bump" start state 72 with the SYS ON flag 54 or the DRV ON flag 60.

In determining state transitions from a purely fuel economy perspective, all powertrain torque below a fairly low motive power threshold, typically in the range of 5 kW to 12 kW for a compact or mid-size vehicle, should be electric. When the engine 20 is on, it should be delivering at least the threshold power for the combined load of the vehicle requirements and battery charging load. The threshold represents an efficiency crossover point 110 in FIG. 6. Thus, small errors in the exact value do not have a major effect on fuel economy.

Figure 6:
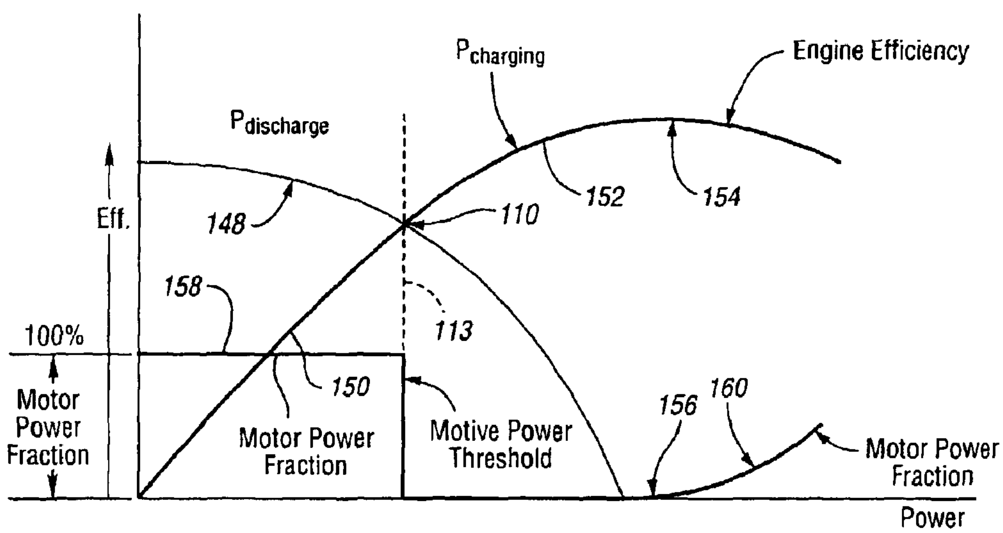
FIG. 6 is a plot of effective engine operating efficiency and motor operating efficiency as a function of power.

Adding driver demand to the transitions takes into account at least two considerations: 1) whether the instantaneous power demand at the present vehicle speed exceeds the motive power threshold 113 in FIG. 6, and 2) whether the anticipated time at which the demand power at the present accelerator position and rate of vehicle acceleration will become less than the time it will take to start the engine 20 (conservatively 0.7 seconds). A representative demand function is shown in FIG. 3 at 102.

Figure 3:
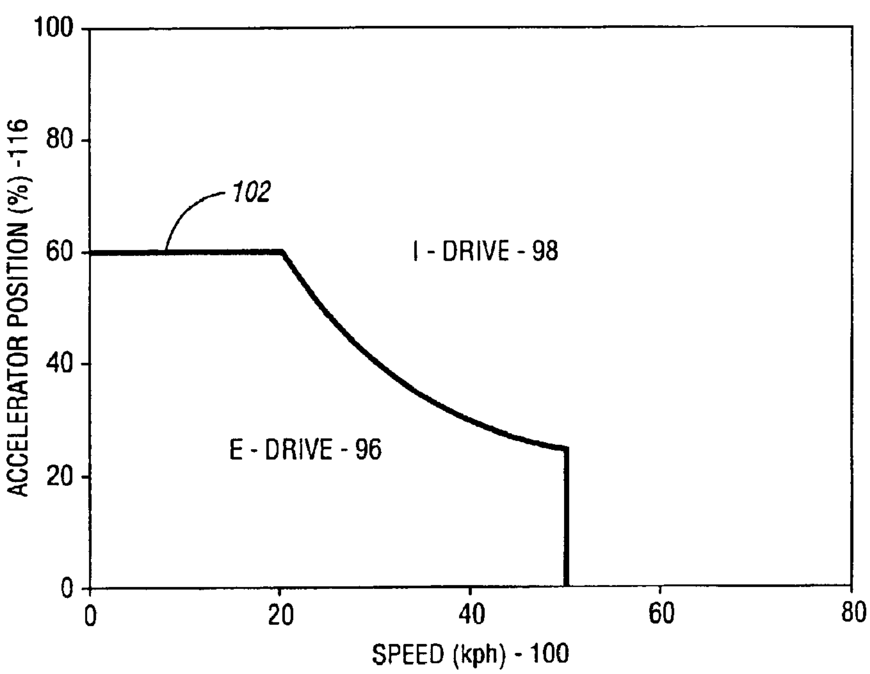
FIG. 3 illustrates a hybrid electric vehicle (HEV) driver demand function.

FIG. 3 illustrates an electric drive (E-drive) zone 96 and an engine drive (I-drive) zone 98 as a function of accelerator position 116 and a vehicle speed 100. This is roughly the equivalent of a function of torque and vehicle speed. The specific curve 102 is only a suggestion and should be treated as a calibratable threshold parameter for starting the engine 20. However, it must always lie within—possibly just within—the actual capabilities of the electric drive. For optimal fuel economy, it should lie near the locus of the motive power threshold, as it would appear on FIG. 3.

When using the disclosed embodiment and the above described engine startup procedure, the anticipator function uses the value and rate of change of the input parameters. In this case, the driver accelerator position "%" and vehicle speed "v", which together can be used to compute power demand "P" and estimate the time remaining until the power demand exceeds some threshold near the maximum capability of the electric drive system.

In the described embodiment of the invention, the anticipator for the first of these transitions—"get ready to drive"—is used to pre-spin the drive motor to its "idle speed." This generates hydraulic pressure in preparation for delivering torque to the wheels. The motor/generator 22 is turned off and the inverter 34 is put in a "sleep mode" as much as possible to minimize the parasitic electric load. The "get ready to drive" anticipator will consider: vehicle speed (motion in either direction signals the need or motive power); throttle touch (any finite signals the intent to launch); brake switch (e.g., removing the foot from the brake signals the intent to launch); brake master cylinder pressure (MCP); and the rate of decrease in brake pressure given by the formula d(MCP)/dt (i.e., a rapid decrease in brake pressure signals the intent to launch).

Of these four, the rapid decrease in brake pressure is the most critical. A decreasing brake pressure, even with finite pressure remaining, can signal the intent to launch well in advance of the actual driver expectation of torque in response to the throttle touch that will occur a large fraction of a second later. Thus the anticipator can bring the motor/generator drive unit 22 to its "idle" speed before the demand actually appears. Therefore, it is "anticipated".

The second critical transition, "switch to engine power", is somewhat more complex. Here, it is important to avoid "false starts" in which the engine 20 is started just above the motive power threshold only to be shut off a moment later, while also avoiding "stumbles" in which the demand power exceeds the capabilities of the drive motor before the engine can be brought in. The HEV system design must leave ample margin between the motive power threshold the motor/generator 22 capabilities. The "switch to engine" anticipator will consider:

Vehicle speed: "v"

Rate of acceleration: dv/dt

Throttle position: "%"

Rate of change of throttle: d(%)/dt

Mass/grade: It may be possible to identify the actual vehicle mass and possibly road grade and adjust the operating strategy accordingly.

Figure 4:
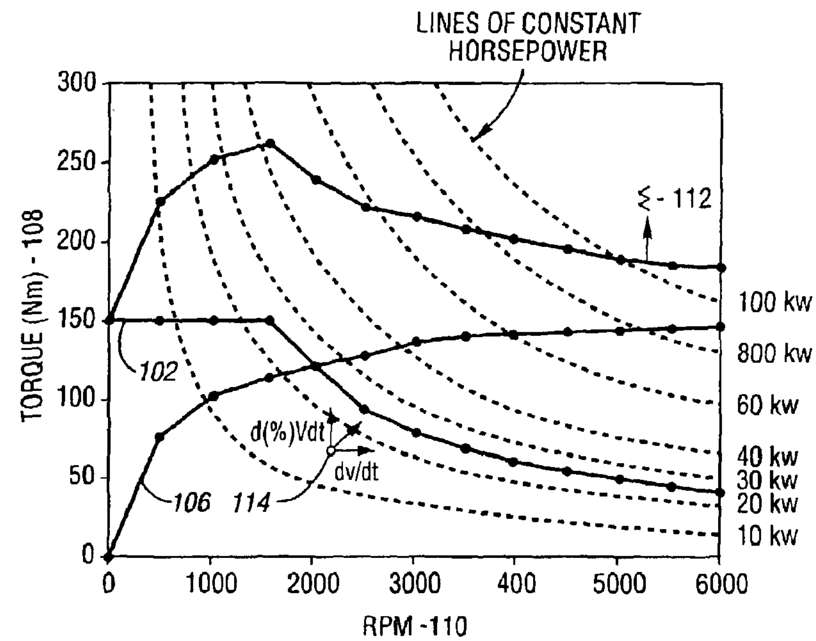
FIG. 4 illustrates a hybrid electric vehicle (HEV) speed-torque map.

The anticipator strategy of the invention requires the motor/generator drive unit 22 to operate as a pseudo-engine such that overall vehicle control remains largely unchanged irrespective of whether the engine 20 is running. The torque capabilities of each in isolation and in combination are illustrated in FIG. 4. FIG. 4 is inpended as a starting point for defining the relationship between driver demand as determined by accelerator position and vehicle speed and motor/engine torque.

FIG. 4 illustrates an electric drive torque map 102 and an engine drive torque map 106 as a function of torque 108 and speed 110. A Sum torque 112 combines the electric drive torque map 102 and the engine drive torque map 106. Both torque curves are oversimplified. The battery-limited torque curve of the preferred HEV embodiment is approximated as a 25 kW motor. A more capable battery would extend the constant-torque region to over 2500-rpm.

FIG. 4 also has a "switch to engine" anticipator 114 with an open circle that represents instantaneous values of vehicle speed and driver demand well above the motive power threshold (10 kW), but well below the limits of the electric drive (25 kW). The length of the horizontal vector is the rate of vehicle acceleration, and the vertical vector the rate of change of the driver demand. Both are multiplied by the estimated time required to start the engine (e.g., 700 ms), then summed to extrapolate to the new position expected 700 ms hence. In FIG. 4, the extrapolated position—the anticipator point—lies on the locus of drive motor capability, indicating that it is time to start the engine 20.

If the tip of the anticipator falls below the motive power threshold due to decreasing speed and/or demand, the engine should not be started. When the anticipator vector lies within the motor capability, the decision to start the engine is made on the basis of efficiency. This decision is based on some combination of a running average of demand power and imposed hysteresis in the motive power threshold (e.g., using an upper threshold for starting, and a lower one for engine shutoff). Accidentally running on the engine 20 power just below the threshold, or running the motor/generator 22 just above, does not impose a significant fuel economy penalty. The wide gap between the motive power threshold and motor/generator 22 capability is deliberately designed into the HEV system to allow occasional but brief periods of high motive power without forcing the engine 20 to start for what may prove to be only a very short time.

Because the system spends very little time in this rather inefficient mode (because the running power average mounts very rapidly), this strategy does not undermine fuel economy. With calibration of the anticipator functions, possibly including higher order polynomials or other nonlinear functions, and careful construction of the power averaging function, the optimal energy management strategy can be realized with no operational annoyance false starts and stumbles.

In the disclosed embodiment of the present invention, motive power threshold, where the engine 20 needs to be started, can be shown algebraically as:

$$P=a\times T_q\times V;$$

$$dP/dt=a\times T_q\times dV/dt+a\times \text{Speed}\times dT_q/dt;$$

where "a" is a constant. The time "T" remaining before crossing the threshold is given by:

$$T=(P_{max}-P)/(dP/dt)$$

If there is also a maximum torque limit, as in FIG. 4, the time to reach that limit must also be computed as:

$$T=(T_{qmax}-T_q)/(dT_q/dt)$$

If, for example, it takes one second to start the engine 20 and bring it up to some target power output, the engine 20 start process will be initiated when the "anticipator time" falls below one second. Use of the anticipator function to determine whether to start the engine 20 in response to increasing power demand will minimize the frequency of "false starts", after which the demand power is high only for a brief period and never exceeds that of the motor/generator 22, while ensuring that the engine 20 will start in time to provide power if needed.

Anticipators can also determine whether to shut the engine 20 off in response to a sudden decrease in demand power simply by choosing a lower power threshold. An HEV braking system's master cylinder pressure (MCP) and its time rate of change can also be included in this anticipator function.

In the operation of the HEV system in the disclosed embodiment, the motor/generator drive unit 22 must be spinning in order for the transmission to carry torque. However, to reduce energy consumption it is desirable to stop the motor/generator 22 when possible and turn it off always when the vehicle is at rest. In a simple implementation, a touch of the accelerator, any vehicle motion, or removal of brake force can be used to trigger the restart of the motor/generator drive unit 22. However, such a simple control might result in an annoying delay in vehicle launch. An anticipator that observes the force on a brake and its rate of change to compute the time remaining before vehicle motion can begin or would begin in a conventional vehicle in which "creep" (forward motion with no touch to either brake or accelerator) can be used to signal the need to spin the motor. The system would be ready to deliver power even before the driver actually demands it. In the case of the HEV in the disclosed embodiment, a "false start" of the motor/generator 22 consumes little energy and my not be detectable.

Figure 5:
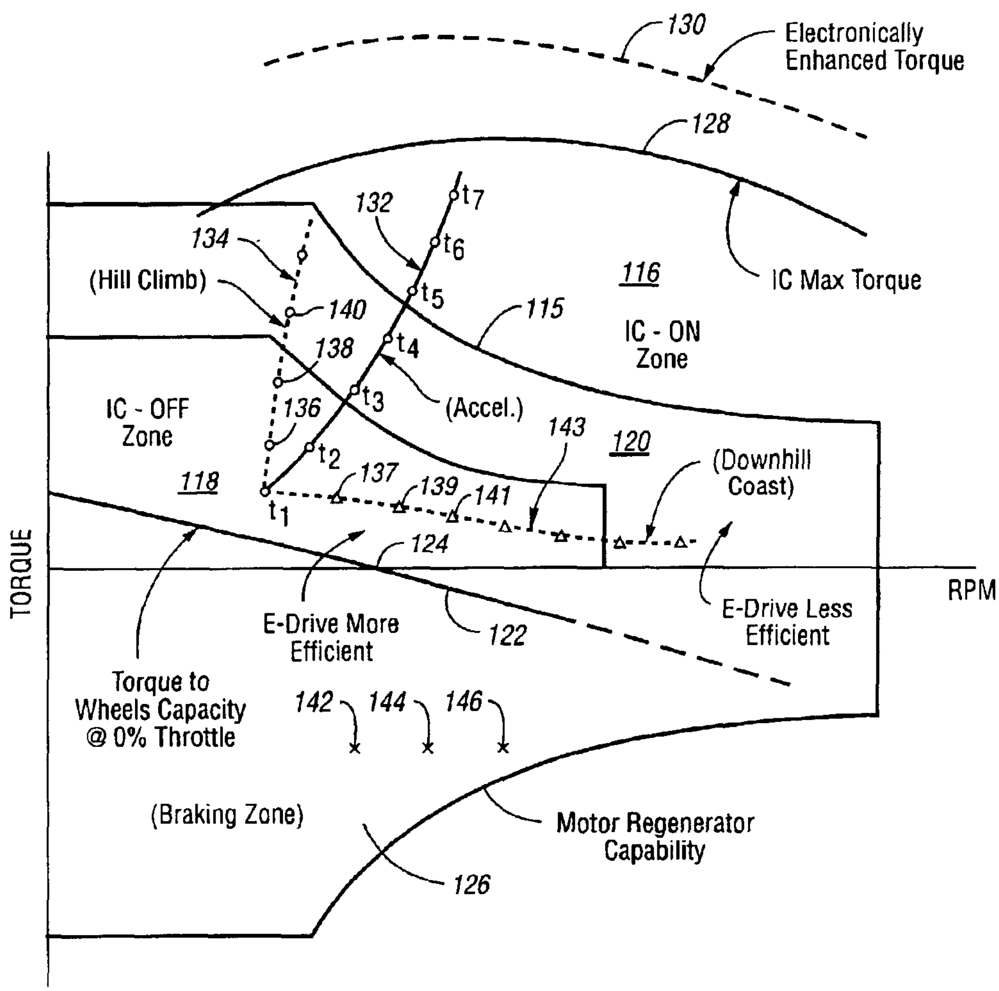
FIG. 5 is a plot that shows powertrain characteristics similar to those shown in FIGS. 3 and 4, but which includes a braking speed-torque zone where the motor acts in a regenerative mode.

FIG. 5 shows the relationship between torque and speed including the drive motor operating zone 96 and the engine operating zone 98 shown in FIG. 3. It shows in addition, however, the regenerative motor braking zone where the torque is illustrated as a negative value.

In the positive torque part of the plot of FIG. 5, the limit of the driving torque capability of the motor is shown at 115. The engine operating zone is shown at 116. The operating zone for the motor that is characterized by a high motor efficiency is shown in FIG. 5 at 118. The engine is turned off while operating in zone 118. When the powertrain operating conditions are in a region intermediate zone 116 and zone 118, which is shown at 120, the motor is effective, but it is less efficient than it is in zone 118.

The braking capacity of the powertrain with a closed throttle is shown in FIG. 5 by the linear relationship 122. A positive torque typically is delivered from the engine to the traction wheels when the throttle is closed, as shown by the portion of line 122 on the left side of the zero crossover point 124. As the speed increases, a braking torque is established in the negative braking zone 126.

Curve 128 represents an internal combustion engine torque curve. The sum of the motor torque and the engine torque is represented by curve 130.

During the acceleration mode, the speed and torque value at time T1 shown in FIG. 5 is in the motor drive efficient operating zone 118. If the value for speed and torque again is measured in a subsequent control loop at time T2, the value of the torque will be greater during acceleration. If the acceleration mode continues, progressively increasing torque values are effected at times T3, T4, T5, T6 and T7 as shown at 132. If the time required to start the engine is 700 ms, for example, and the estimated time at point T4 is 700 ms from the anticipated time needed for the motor to reach the limit of its capacity, the engine will be commanded to start. Thus when the motor loses sufficient efficient driving torque capability while the powertrain is operating within region 120, the engine will have come up to speed and is capable of delivering the needed driving torque in a seamless fashion.

The speed torque values detected during operation in the motor drive zone are defined by a plot 132, which has an upward trend representative of the acceleration mode. If the vehicle is being accelerated while climbing a hill, the slope of the speed torque plot is much steeper, as shown at 134. The speed torque values detected at various instants corresponding to time T1, T2, T3, etc., are shown in FIG. 5, respectively, at 136, 138, 140, etc.

If, as in the case of plot 132, the time at which the plot 134 approaches the limit of the motor driving capability is equal to the pre-calculated time to start the engine (e.g., 700 ms), the engine will be started. Thus, vehicle acceleration is one of the conditions that can be used in an anticipator strategy.

If the vehicle is in a downhill coast, the plot of speed and torque values at times correspopding to time T1, T2, T3, etc, is shown at 143. Speed and torque values may be determined at times 137, 139, 141, etc. When a point on plot 143 is 700 ms from the motor/generator capability plot, for example, the engine will be started.

If the motor is operating in the braking zone, repetitive speed torque readings are made, for example, at time values 142, 144, 146, and it is determined at point 146 that a time of 700 ms separates that point from the motor/generator capability plot, the engine will enter the engine braking zone as the clutch 40 is engaged and the enaipe throttle is moved toward the closed position.

FIG. 6 is a plot of the powertrain efficiency versus speed. The efficiency of the driveline during battery discharge in the motor drive zone with the engine off is shown at 148. At that time, the engine efficiency, because of the speed-torque characteristic of the engine, would have a much lower efficiency as shown at 150. As the speed increases, the engine efficiency increases and the motor efficiency decreases. At the crossover point 110, the engine is turned on and the battery is in a charging state, as shown at 152.

At the peak of the engine curve as shown at 154, the fraction of the motor power is low or zero, as shown at 156. This is in contrast to the fraction of the motor power at lower speeds, which is 100 percent, as shown at 158. At the motive power threshold 113, the motor power is replaced with engine power. After the peak engine efficiency is reached at 154, engine efficiency drop occurs. This would correspond to an increase in the motor power fraction, as shown at 160.

The overall power is equal to the sum of the battery power plus internal combustion engine power. The effective overall efficiency for the entire powertrain is a product of the efficiency of the power transmitted by the engine to the transmission and the power required to charge the battery, times the efficiency of the generator during charging of the battery, times the efficiency of the battery during charging, times the efficiency of the battery during discharge, times the efficiency of the motor during discharge.

Other vehicle conditions and control parameters can be used in anticipator strategies. Also, functions more complex than the simple linear relationships described here can also be used to improve the overall driving characteristics of the system.

Although one embodiment of the invention has been disclosed, it will be apparent to persons skilled in the art that modifications may be made without departing from the scope of the invention. All such modifications, and equivalents thereof, are within the scope of the following claims.

What is claimed:

1. A control system for a hybrid electric vehicle with a powertrain having a throttle-controlled internal combustion engine, the vehicle including brake pedal-controlled vehicle wheel brakes and an accelerator pedal-controlled engine throttle, the control system including accelerator pedal and brake pedal driver inputs, an electric motor/generator drive unit, a disconnect clutch between the engine and the drive unit, a power transmission between the drive unit and vehicle traction wheels, and a battery electrically connected to the drive unit for powering the same, the control system comprising:

an electronic controller including an engine speed and torque control and a drive unit speed and torque control whereby engine torque and engine on and off states are controlled;

the drive unit having a speed and torque first operating zone characterized by high efficiency drive unit torque delivery to the transmission with the engine turned off, the engine having a speed and torque second operating zone characterized by high efficiency engine torque delivery with the drive unit turned off;

means for anticipating an instant when a limit of the speed and torque first operating zone for the drive unit is reached whereby the engine is started at a pre-calculated time before the speed and torque second operating zone is entered, thereby effecting smooth power transition from the speed and torque first operating zone to the speed and torque second operating zone;

the control system including accelerator pedal and brake pedal drivers input, the control system including also means for measuring a rate of change of accelerator pedal position; and means for responding to a measured rate of change of accelerator pedal position whereby the engine is started at a calculated time before a limit for the speed and torque first operating zone is reached.

2. A control system for a hybrid electric vehicle having pedal-operated wheel brakes and a powertrain having a throttle-controlled internal combustion engine, an electric motor/generator drive unit, a disconnect clutch between the engine and the drive unit, a power transmission between the drive unit and vehicle traction wheels and a battery electrically connected to the drive unit for powering the drive wait, the control system comprising:

an electronic controller including an engine speed and torque control and a drive unit speed and torque control whereby engine torque and engine on and off states and drive unit torque and drive unit on and off states are controlled;

the drive unit having a speed and torque first operating zone characterized by high efficiency drive unit torque delivery to the transmission with the engine turned off, the engine having a speed and torque second operating zone characterized by high efficiency engine torque delivery with the drive unit turned off, and means for anticipating an instant when a limit of one speed and torque operating zone is reached as the other operating zone is entered whereby a smooth power transition is made between the operating zones;

the control system including a throttle actuating accelerator pedal driver input and brake pedal driver input and means for measuring rate of change of brake pedal force;

the control system responding to a measured rate of change of brake pedal force whereby the engine is started at a calculated time relative to a limit of the speed and torque first operating zone with the powertrain operating in the speed and torque first operating zone and whereby the drive unit is started at a calibrated time relative to a limit of the speed and torque second operating zone with die powertrain operating in the speed and torque second operating zone.

3. A control system for a hybrid electric vehicle powertrain having a throttle-controlled internal combustion engine, the vehicle having brake pedal-controlled vehicle wheel brakes, an electric motor/generator drive unit, a disconnect clutch between the engine and the drive unit, a power transmission between the drive unit and vehicle traction wheels and a battery electrically connected to the drive unit for powering the drive unit, the control system comprising:

an electronic controller including an engine speed and torque control and a drive unit speed and torque control whereby engine torque and engine on and off states and drive unit torque and drive unit on and off states are controlled;

the drive unit having a speed and torque first operating zone characterized by high efficiency drive unit torque delivery to the transmission with the engine turned off, the engine having a speed and torque second operating zone characterized by high efficiency engine torque delivery with the drive unit turned off; and means for anticipating an instant when a limit of one of the first and second speed and torque operating zones is reached as the other of the first and second speed and torque operating zones is entered whereby a smooth power transition is made between the first and second speed and torque operating zones;

the engine having an accelerator pedal controlled throttle and the electronic controller responding to powertrain operating variables including rate of change of accelerator pedal position.

4. A method for controlling a hybrid electric vehicle powertrain having a throttle-controlled internal combustion engine, an electric motor/generator drive unit and a disconnect clutch between the engine and the drive unit, a power transmission between the drive unit and vehicle traction wheels, a driver operated brake pedal for controlling regenerative drive unit braking and a battery electrically connected to the drive unit for powering the same, the method comprising the steps of:

controlling engine speed and torque and drive unit speed and torque in response to engine throttle position whereby speed and torque values for the drive unit are within a first operating zone corresponding to high efficiency of the drive unit and speed and torque values for the engine are within a second operating zone corresponding to high efficiency of the engine;

operating the drive unit in the first operating zone with the engine off;

operating the engine in the second operating zone with the drive unit off;

establishing regenerative drive unit braking in a regenerative braking operating zone in response to driver operated brake pedal force;

anticipating, upon changes in speed and torque, as brake pedal force changes, a torque limit of the regenerative braking operating zone whereby the engine throttle is adjusted toward a closed engine throttle and the disconnect clutch is engaged to condition the engine for developing braking torque a pre-calibrated time before the regenerative braking operation zone torque limit for the drive unit is achieved.

5. A control system for a hybrid electric vehicle with a powertrain having a throttle-controlled internal combustion engine, an electric motor/generator drive unit and a disconnect clutch between the engine and the drive unit, a power transmission between the drive unit and vehicle traction wheels, and a battery electrically connected to the drive unit for powering the same, the control system comprising:

an electronic controller including an engine speed and torque control and a drive unit speed and torque control whereby engine torque and engine on and off states are controlled;

the drive unit having a speed and torque first operating zone characterized by high efficiency drive unit torque delivery to the transmission with the engine turned off, the engine having a speed and torque second operating zone characterized by high efficiency engine torque delivery with the drive unit turned off;

the engine and the drive unit having an intermediate region of speed and torque operating conditions in which the drive unit operates with reduced efficiency and in which the engine may be started outside of the second operating zone to develop driving torque at the traction wheels while the powertrain operates in the intermediate region; and means for anticipating an instant when a limit of the speed and torque first operating zone for the drive unit is reached whereby the engine is started at a pre-calculated time before the speed and torque second operating zone is entered, thereby effecting a smooth power transition from the speed and torque first operating zone to the speed and torque second operating zone;

the vehicle including an accelerator controlled engine throttle, the control system including an accelerator pedal for effecting engine throttle driver input and means for measuring rate of change of accelerator pedal position, the control system including also means for responding to a measured rate of change of accelerator pedal position whereby the engine is started at a calibrated time before the speed and torque second operating zone is reached.

6. A control system for a hybrid electric vehicle with a powertrain having a throttle-controlled internal combustion engine, an electric motor/generator drive unit and a disconnect clutch between the engine and the drive unit, a power transmission between the drive unit and vehicle traction wheels and a battery electrically connected to the drive unit for powering the drive unit, the control system comprising:

an electronic controller including an engine speed and torque control and a drive unit speed and torque control whereby engine torque and engine on and off states and drive unit torque and drive unit on and off states are controlled;

the drive unit having a speed and torque first operating zone characterized by high efficiency drive unit torque delivery to the transmission with the engine turned off, the engine having a speed and torque second operating zone characterized by high efficiency engine torque delivery with the drive unit turned off;

the engine and the drive unit having an intermediate speed and torque operating region wherein the drive unit operates with reduced efficiency and the engine may be started outside of the speed and torque second operating zone to develop driving torque at the wheels; and means for anticipating an instant when a limit of one of the first and second speed and torque operating zones is reached as the other of the first and second speed and torque operating zones is entered whereby a smooth power transition is made between the first and second speed and torque operating zones;

the vehicle including brake pedal-controlled vehicle wheels brakes, the control system including a brake pedal driver input, the control system responding to a rate of change of brake pedal force whereby the engine is started at a calibrated time within the intermediate speed and torque operating region.

7. A control system for a hybrid electric vehicle with a powertrain having a throttle-controlled internal combustion engine, an electric motor/generator drive unit and a disconnect clutch between the engine and the drive unit, a power transmission between the drive unit and vehicle traction wheels and a battery electrically connected to the drive unit for powering the drive unit, the control system comprising:

an electronic controller including an engine speed and torque control and a drive unit speed and torque control whereby engine torque and engine on and off states and drive unit torque and drive unit on and off states are controlled;

the drive unit having a speed and torque first operating zone characterized by high efficiency drive unit torque delivery to the transmission with the engine turned off, the engine having a speed and torque second operating zone characterized by high efficiency engine torque delivery with the drive unit turned off;

the engine and the drive unit having an intermediate speed and torque operating region wherein the drive unit operates with reduced efficiency and the engine may be started outside of the second speed and torque operating zone to develop driving torque at the wheels; and means for anticipating an instant when a limit of one the first and second speed and torque operating zones is reached as the other of the first and second speed and torque operating zones is entered whereby a smooth power transition is made between the speed and torque operating zones;

the vehicle including brake pedal-controlled vehicle wheels brakes, the control system including a brake pedal driver input, the control system responding to a rare of change of brake pedal force whereby the engine is started at a calibrated time within the intermediate speed and torque operating region;

the engine having an accelerator pedal controlled throttle and the electronic controller responding to powertrain operating variables including rate of change of accelerator pedal position.

8. A control system for a hybrid electric vehicle powertrain having a throttle-controlled internal combustion engine, an electric motor/generator drive unit and a disconnect clutch between the engine and the drive unit, a power transmission between the drive unit and vehicle traction wheels and a battery electrically connected to the drive unit for powering the drive unit, the control system comprising:

an electronic controller including an engine speed and torque control, a drive unit speed and torque control and means for determining vehicle acceleration whereby engine torque and engine on and off states and drive unit torque and drive unit on and off states are controlled;

the drive unit having a speed and torque first operating zone characterized by high efficiency drive unit torque delivery to the transmission with the engine turned off, the engine having a speed and torque second operating zone characterized by high efficiency engine torque delivery with the drive unit turned off;

the engine and the drive unit having an intermediate speed and torque operating region wherein the drive unit operates with reduced efficiency and the engine may be started outside of the speed and torque second operating zone to develop driving torque at the wheels; and means for anticipating an instant when a limit of one speed and torque operating zone is reached as the other speed and torque operating zone is entered whereby a smooth power transition is made between the speed and torque operating zones;

the vehicle including brake pedal-controlled vehicle wheel brakes, the control system including a brake pedal driver input, the control system responding to a rate of change of brake pedal force whereby the engine is started at a calibrated time before a limit of the intermediate operating region is reached with the powertrain operating in the intermediate operating region;

the electronic controller responding to powertrain operating variables including rate of change of brake pedal position and vehicle acceleration.

9. A control system for a hybrid electric vehicle powertrain having a throttle-controlled internal combustion engine, the vehicle having brake pedal-controlled vehicle wheel brakes, an electric motor/generator drive unit, a disconnect clutch between the engine and the drive unit, a power transmission between the drive unit and vehicle traction wheels and a battery electrically connected to the drive unit for powering the drive unit, the control system comprising:

an electronic controller including an engine speed and torque control, a drive unit speed and torque control and means for determining vehicle acceleration whereby engine torque and engine on and off states and drive unit torque and drive unit on and off states are controlled;

the drive unit having a speed and torque first operating zone characterized by high efficiency drive unit torque delivery to the transmission with the engine turned off, the engine having a speed and torque second operating zone characterized by high efficiency engine torque delivery with the drive unit turned off, and means for anticipating an instant when a limit of one of the first and second engine speed and torque operating zones is reached as the other of the first and second speed and torque operating zones is entered whereby a smooth power transition is made between the speed and torque operating zones;

the engine having an accelerator pedal controlled throttle and the electronic controller responding to powertrain operating variables including rate of change of accelerator pedal position and vehicle acceleration.

* * * * *